US010958580B2

(12) United States Patent
Kapoor et al.

(10) Patent No.: US 10,958,580 B2
(45) Date of Patent: Mar. 23, 2021

(54) SYSTEM AND METHOD OF PERFORMING LOAD BALANCING OVER AN OVERLAY NETWORK

(71) Applicant: COLORTOKENS, INC., Santa Clara, CA (US)

(72) Inventors: Anoop Singh Kapoor, San Jose, CA (US); Ashish Trivedi, Fremont, CA (US); Ravi Voleti, Fremont, CA (US); Deepak Mohanty, Fremont, CA (US); Mritunjay Kumar, San Jose, CA (US)

(73) Assignee: COLORTOKENS, INC., Santa Clara, CA (US)

( * ) Notice: Subject to any disclaimer, the term of this patent is extended or adjusted under 35 U.S.C. 154(b) by 94 days.

(21) Appl. No.: 16/163,532

(22) Filed: Oct. 17, 2018

(65) Prior Publication Data
US 2020/0127923 A1 Apr. 23, 2020

(51) Int. Cl.
*H04L 12/803* (2013.01)
*H04L 29/12* (2006.01)
*H04L 29/08* (2006.01)

(52) U.S. Cl.
CPC ........ *H04L 47/125* (2013.01); *H04L 61/1511* (2013.01); *H04L 61/2007* (2013.01); *H04L 67/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,937,477 B1* | 5/2011 | Day | ................... | G06Q 20/401 709/227 |
| 10,348,767 B1* | 7/2019 | Lee | ................... | H04L 67/10 |
| 10,728,121 B1* | 7/2020 | Chitalia | ................... | H04L 41/12 |
| 2010/0036954 A1* | 2/2010 | Sakata | ................... | H04L 67/1002 709/226 |
| 2010/0223364 A1* | 9/2010 | Wei | ................... | H04L 47/125 709/220 |
| 2010/0223378 A1* | 9/2010 | Wei | ................... | H04L 47/822 709/224 |
| 2011/0055386 A1* | 3/2011 | Middleton | ................... | H04L 67/2842 709/224 |
| 2011/0060812 A1* | 3/2011 | Middleton | ................... | G06F 16/9574 709/219 |

(Continued)

*Primary Examiner* — Yee F Lam
(74) *Attorney, Agent, or Firm* — Barry Choobin; Patent 360LLC (57) ABSTRACT

A system and method for performing load balancing over an overlay network is disclosed. The load balancing is performed by a DNS load balancing module communicating to a plurality of computing devices communicatively coupled over the overlay network. The DNS load balancing module calculates and maintains a weighted value of each computing device among the plurality of computing device based on a plurality of parameters. The DNS load balancing module on receiving a DNS lookup request for a resource from a first computing device identifies a list of computing device among the plurality of computing device hosting the requested resource. The DNS load balancing module further performs load balancing by selecting a computing device among a list of computing devices for accessing the resource based on a weighted value calculated.

14 Claims, 5 Drawing Sheets

(56) References Cited

U.S. PATENT DOCUMENTS

| | | | |
|---|---|---|---|
| 2011/0137973 A1* | 6/2011 | Wei | H04L 67/1008 709/202 |
| 2011/0231515 A1* | 9/2011 | Day | G06Q 20/401 709/217 |
| 2016/0094621 A1* | 3/2016 | Wolfe | H04L 67/288 709/203 |
| 2018/0091591 A1* | 3/2018 | Puri | H04L 67/1095 |
| 2019/0190894 A1* | 6/2019 | Kapoor | H04L 63/0428 |

* cited by examiner

SYSTEM AND METHOD OF PERFORMING LOAD BALANCING OVER AN OVERLAY NETWORK

BACKGROUND

Technical Field

The embodiments herein are generally related to internet protocol networking in a computer environment. The embodiments herein are more particularly related to routing and load balancing of traffic over an overlay network.

Description of the Related Art

Typically, a computer network is a digital telecommunication network with a plurality of computing devices (nodes) sharing resources with each other. The plurality of computing devices in the computer network is linked together through communication channels or tunnels for sharing the resources. One of the most popular examples of the computer network is internet. With internet, traffic or data packets from a first computing device (source) are routed to a second computing device (destination) based on Internet Protocol (IP) address on a header of a data packet. Routing is a process of selecting a path for the traffic in the computer network.

Further, the computer network includes a core networking solution called load balancing to efficiently distribute the traffic across the plurality of computing devices. So far, there are many methods proposed for performing load balancing in the computer network. Examples of such methods include round robin method, Domain Name System delegation, client side random load balancing, server side load balancing and the like. Each method for performing load balancing, has its own advantages and limitation.

Recently, overlay networks were proposed to overcome certain limitations while communicating over the internet. The overlay networks are proposed as a way to improve internet routing, such as quality of services, network security and the like. The overlay networks are computer network built on top of another network called an underlay network. Nowadays, the internet act as the underlay network, over which many overlay networks is constructed. The overlay networks are created by generating a new address space. However, such overlay networks or new address spaces introduces a two-fold problem.

A first problem includes an increase m operational and manageability cost and complexity that occurs while creating the overlay network. Consider a scenario when a Domain Name System (DNS) look up request (a Uniform Resource Locator (URL) of a resource) is raised by a computing device in the overlay network. In such cases, the overlay network relies on a corporate DNS server to translate the URL or host name to a respective underlay IP address. The corporate DNS server stores hundreds or thousands of DNS entries including, the URL of all the resources hosted by the plurality of computing devices and underlay IP address of each computing device among the plurality of computing devices. Hence, while creating the overlay network with the new address space, updating the DNS server with the overlay IP address of each computing device is a tedious task which increases the operational and manageability cost and complexity.

Further, a second problem includes inefficient load balancing while routing traffic between the plurality of computing devices. The resources may be hosted by computing device in different overlay network. The computing devices in a first overlay network access the resources hosted by the other computing devices in the first overlay network. Similarly, the computing devices in a second overlay network access the resources hosted by the other computing devices in the second overlay network. However, most of the DNS server available in market does not provide correct name space resolution based on the computing device raising the DNS request.

Hence, there is a need for a system and a method a need for a system and a method for performing load balancing over an overlay network. There is also a need for a method for identifying and routing traffic over a single overlay IP tunnel for a DNS request to communicate with a least loaded computing device.

SUMMARY OF THE EMBODIMENTS HEREIN

The embodiments herein provide a system and method for performing load balancing over an overlay network. The system includes a Domain Name System (DNS) load balancing module for performing load balancing in the overlay network. The DNS load balancing module calculates and maintains a weighted value of each computing device among a plurality of computing devices in the overlay network. The DNS load balancing module on receiving a DNS lookup request, identifies a list of computing devices among the plurality of computing devices hosting the requested resource. The DNS load balancing module further performs load balancing by selecting a computing device among the list of computing devices for accessing the resource based on a weighted value calculated.

According to an embodiment herein, a computing network system for performing load balancing over an overlay network is disclosed. The computing network system includes a plurality of computing devices, a first DNS server, and a DNS load balancing module. The plurality of computing devices is communicatively coupled over the overlay network. The first computing device among the plurality of computing devices initiates a Domain Name System (DNS) lookup request for a resource. The first DNS server on receiving the DNS lookup request is configured for identifying underlay Internet Protocol (IP) address of a list of computing devices among the plurality of computing devices hosting the resource. The first DNS server stores the underlay IP address of each computing device among the plurality of computing devices, and a uniform resource locator (URL) of a plurality of resources installed on, the plurality of computing devices. The DNS load balancing module is configured for performing load balancing by providing an overlay IP address of a second computing device among the list of computing devices to the first computing device for accessing the resource. The DNS load balancing module calculates a weighted value of each computing device among the list of computing devices for identifying the second computing device communicating with a minimum number of computing devices over the overlay network.

According to an embodiment herein, the DNS load balancing module includes a second DNS server, a database and a policy engine. The second DNS server is configured to store the overlay IP address of each computing device among the plurality of computing devices. The database is configured to store the underlay IP address and the overlay IP address of each computing device among the plurality of computing devices. The policy engine is configured to perform load balancing by providing the overlay IP address of the second computing device to the first computing device. The policy engine identifies the second computing device communicating with minimum number of computing devices and translates the underlay IP address of the second computing device to the corresponding overlay IP address.

According to an embodiment herein, the DNS load balancing module receives the DNS lookup request for the resource from the first computing device. The DNS load balancing module transfers the DNS lookup request to the first DNS server. Further, the DNS load balancing module obtains, from the first DNS server, the underlay IP address of the list of computing devices hosting the resource. The DNS load balancing module translates the underlay IP address of each computing device among the list of computing devices to corresponding overlay IP address. Further, the DNS load balancing module calculates the weighted value of each computing device based on at least one of parameter including Central Processing Unit (CPU) capability, current CPU utilization, free Random Access Memory (RAM) availability, bandwidth of overlay network interface, current utilization of overlay interface, geolocation of the computing device, network latency, and network congestion. The DNS load balancing module identifies the second computing device communicating with minimum number of computing devices over the overlay network based on the weighted value calculated. The DNS load balancing module provides the overlay IP address of the second computing device to the first computing device to communicate with the resource requested.

According to an embodiment herein, the plurality of computing devices includes but is not limited to computers, laptops, mobile phones, servers and databases.

According to an embodiment herein, the overlay network is created over an underlay network by assigning the overlay IP address to each computing device among the plurality of computing devices.

According to an embodiment herein, the resources are identified by fetching data from an application program interface on each computing device.

According to an embodiment herein, the second computing device is identified from the list of computing device hosting the resource.

According to an embodiment herein, the second computing device is further identified based on a policy match between the first computing device and the second computing device for communicating with the resource requested.

According to art embodiment herein, the first computing device is a client device selected from a group consisting of laptops, computer, and mobile phones.

According to an embodiment herein, the second computing device is a device hosting a plurality of resources such as a server.

According to an embodiment herein, the DNS load balancing module restricts the access to the resource over the underlay network by providing the overlay IP address of the second computing device to the first computing device.

According to era embodiment herein, a computer implemented method of performing load balancing over an overlay network is disclosed. The computer implemented method includes receiving a Domain Name System (DNS) lookup request for a resource from a first computing device among, a plurality of computing devices communicatively coupled over the overlay network. The computer implemented method includes transferring the DNS lookup request to a first DNS server. The first DNS server stores underlay Internet Protocol (IP) address of each computing device among the plurality of computing devices, and a uniform resource locator (URL) of a plurality of resources installed on the plurality of computing devices. The computer implemented method includes obtaining the underlay IP address of a list of computing devices from the first DNS server. Each computing device among the list of computing: devices hosts the resource. The computer implemented method includes translating the underlay IP address of each computing device among the list of computing devices to corresponding overlay IP address by a policy engine in a load balancing module. The computer implemented method includes calculating a weighted value of each computing device among the list of computing devices by the load balancing module. Further, the computer implemented method includes identifying a second computing with the overlay IP address communicating to minimum number of computing devices over the overlay network. The second computing device is identified based on the weighted value. Furthermore, the computer implemented method includes providing the overlay IP address of the second computing device to the first computing device to communicate with the resource requested.

According to an embodiment herein, the plurality of computing devices includes but is not limited to computers, laptops, mobile phones, servers and databases.

According to an embodiment herein, the identification of the second computing device is performed based on policy match between the first computing device and the second computing device for communicating with the resource requested.

According to an embodiment herein, the first computing device is a client device such as laptops, computer, and mobile phones.

According to an embodiment herein, the second computing device is a device hosting a plurality of resources such as a server.

According to an embodiment herein, the calculation of weighted value is performed based on at least one of parameter including Central Processing Unit (CPU)capability, current CPU utilization, free Random Access Memory (RAM) availability, bandwidth of overlay network interface, current utilization of overlay interface, geolocation of the computing device, network latency, and network congestion.

According to an embodiment herein, the calculation of weighted value is performed when the resource is hosted by multiple computing devices among the plurality of computing devices communicatively coupled over the overlay network.

According to an embodiment herein, the resource requested by the first computing device includes services or applications installed on the plurality of computing device.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will be apparent to those s killed in the art from the following description of the preferred embodiment herein and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following, detailed description, a reference is made to the accompanying drawings that form a part hereof, and in which the specific embodiments that may be practiced is shown by, way of illustration. These embodiments are described in sufficient detail to enable those skilled in the art to practice the embodiments and it is to be understood that the logical mechanical and other changes may be made without departing from the scope of the embodiments. The following detailed description is therefore not to be taken in a limiting sense.

The embodiments herein provide a system and method for performing load balancing over an overlay network is disclosed. The method includes calculating and maintaining a weighted value of each computing device among, a plurality of computing devices in an overlay network. The method further includes receiving a DNS lookup request for a resource from a first computing device. Further, the method includes identifying a list of computing devices among the plurality of computing devices hosting the requested resource. The method includes performing load balancing by selecting a computing device among a list of computing devices for accessing the resource based on a weighted value calculated.

Figure 1:
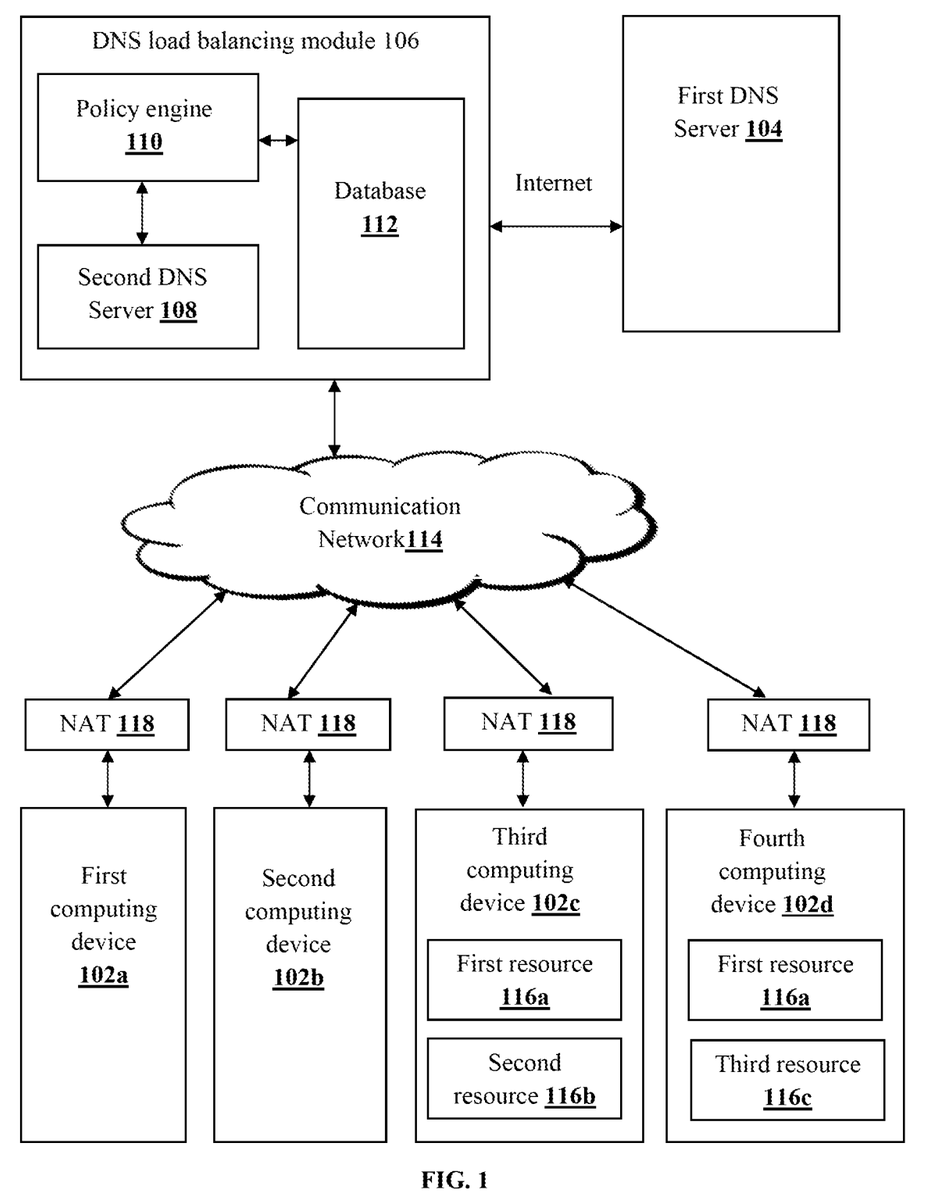
FIG. 1 illustrates a functional block diagram of a system for performing load balancing over an overlay network, according to one embodiment herein.

FIG. 1 illustrates a functional block diagram of a system for performing load balancing over an overlay network, according to one embodiment herein. The system comprises a plurality of computing devices 102a, 102b . . . 102d communicating to each other over a communication network 114. The plurality of computing devices 102a, 102b . . . 102d are connected to an underlay network. The examples of plurality of computing devices 102a, 102b . . . 102d include but are not limited to computers, mobile phones, smart phones, servers and the like. Each computing device among the plurality of computing devices 102a, 102b . . . 102d is assigned an underlay Internet. Protocol (IP) address. The underlay IP address for each computing device is stored on a first Domain Name System (DNS) server 104. The first DNS server 104 may be an upstream DNS server. The first DNS server 104 stores Uniform Resource Locator (URL) or web address or host names of various resources (service or application) on each computing device and the corresponding underlay IP address of the computing device.

The plurality of computing devices 102a, 102b . . . 102d is communicatively coupled over a secure overlay network. The overlay network termed as a color zone is created over the underlay network. The color zone comprises a dedicated IP address space. The color zone is created by assigning an overlay IP address to each computing device. Further, the communications between the computing devices among the plurality of computing devices are routed over the color zone. The plurality of computing devices 102a, 102b . . . 102d host a plurality of resources. In one embodiment, multiple computing device among the plurality of computing devices 102a, 102b . . . 102d host same resources. For example, in FIG. 1 a third computing device 102c among the plurality of computing device comprises a first resource 116a and a second resource 116b and a fourth computing device 102d host the first resource 116a and a third resource 116c.

The system further comprises a DNS load balancing module 106 for performing load balancing over the overlay network. The DNS load balancing module 106 comprises a second DNS server 108, a policy engine 110 and a database 112. The second DNS server 108 stores the overlay IP address assigned, to each computing devices among the plurality of computing devices 102a, 102b . . . 102d. The second DNS server 108 act as a name space resolver for all resources (applications/services) running on the overlay network called the color zones. The database 112 comprising the underlay IP address and corresponding overlay IP address of each computing device among the plurality of computing devices 102a, 102b . . . 102d.

The plurality of computing devices 102a, 102b . . . 102d communicates over the overlay network. Each computing device among the plurality of computing device 102a, 102b . . . 102d feeds and updates a plurality of parameter to the policy engine 110 in the DNS load balancing module 106. The plurality of parameters includes but is not limited to Central Processing Unit (CPU) capability, current CPU utilization, free Random Access Memory (RAM) availability, bandwidth of overlay network interface, current utilization of overlay interface, geolocation of the computing device, network latency, and network congestion. The policy engine 110 automatically and dynamically calculates a weighted value of each computing device based on at least one of the plurality of parameters updated. The policy engine 110 maintains an updated weighted value of each computing device based on the updated value of plurality of parameters provided by each computing device.

Further, a first computing device 102a among the plurality of computing devices 102a, 102b . . . 102d, initiates a DNS lookup request for the first resource 116a. A list of computing devices among the plurality of computing devices 102a, 102b . . . 102d hosting the first resource 116a is updated to the policy engine 110 by the first DNS server 104. Further, the policy engine 110 identifies a computing device among the list of computing devices with maximum weighted value. The computing device is identified based on the weighted value calculated based on the plurality of parameters. Further, the computing device is identified based on a policy match between the first computing device 102a and the computing device hosting the resource requested. Further, the policy engine 110 provides die overlay IP address of the identified computing device to the first computing device 102a to communicate with the resource requested.

For example, consider a third computing device 102c and a fourth computing device 102d hosting the first resource 116a. The policy engine maintains the weighted value of the plurality of computing devices 102a, 102b . . . 102d calculated based on the plurality of parameters. In an exemplary embodiment, consider the third computing device 102c is located close to the first computing device 102a and the fourth computing device 102d is located far away from the first computing device 102a. Hence considering the parameter 'geolocation', the third computing device 102c is provided a higher weighted value compared to the fourth computing device 102d. Suppose the weighted value of third computing device 102c and the fourth computing device 102d calculated based on the remaining parameter is same then the third computing device 102c is selected by the policy engine 110.

In another exemplary embodiment, consider the value of certain parameters such as CPU capability, current CPU utilization, free RAM availability etc as considerably less for the third computing device 102c than the fourth computing device 102d. In such case, the weighted value of the third computing device 102c is less than the weighted value of the fourth computing device 102d. Therefore, the policy engine 110 selects the fourth computing device 102d with higher weighted value than the third computing device 102c even though the third computing device 102c is located close to the first computing device 102a.

The steps of establishing communication are as follows. Consider the first computing device 102a initiating the DNS lookup request for the first resource 116a. The DNS lookup request is forwarded to the first DNS server 104. The first DNS server 104 comprises the URL of the resources on each computing device and the corresponding underlay IP address of the computing device. For example, consider the underlay IP address of the first computing device 102a as 1.1.1.1, the second computing device 102b as 2.2.2.2, third computing device as 3.3.3.3 and the fourth computing device as 4.4.4.4. The first DNS server 104 comprises the URL of the requested resource. Consider the URL of the first resource 116a as app.com.

Further, the underlay IP address of a list of computing devices hosting the first resource 116a is updated to the policy engine 110 by the first DNS server 104. The third computing device 102c and the fourth computing device 102d in FIG. 1 are hosting the first resource 116a. Therefore the underlay IP address of the third computing device 102c, 3.3.3.3 and the underlay IP address of the fourth computing device 102d, 4.4.4.4 are provided to the policy engine.

The policy engine 110 maintains an updated record of weighted value of each computing device among the plurality of computing devices 102a, 102b . . . 102d. The policy engine 110 dynamically and automatically calculates the weighted value based on the plurality of parameters updated by each computing device. Thus the policy engine identifies the weighted value of the third computing device 102c and the fourth computing device 102d hosting the first resource 116a. Further, the policy engine 110 identifies one computing device say third computing device 102c from the list of computing devices having maximum weighted value.

Once the third computing device 102c is identified, the underlay IP address 3.3.3.3 is translated to the corresponding overlay IP address. The database 112 in the DNS load balancing module 106 comprises the underlay IP address and the corresponding overlay IP address of the third computing device 102c. The second DNS server 108 comprises the overlay IP address of the fast computing device 102a and the third computing device 102c. For example, consider the overlay IP address of the first computing device 102a and the third computing device 102c as 192.168.24.1 and 192.168.24.3 respectively. Further, the overlay IP address of the first computing device 102a and the second computing device 102b is communicated to the first computing device 102a.

Further, the first computing device 102a generates a data packet with a header comprising the overlay IP address of the first computing device 102a as the source IP address and the overlay IP address of the third computing device 102c as the destination IP address. The data packet comprises 192.168.24.1 as the source IP address and 192.168.24.3 as the destination IP address. The first computing device 102a transmits the data packet to the third computing device 102c over the overlay network to enable communication with the first resource 116a. Hence, for each DNS look up request, the system identifies a minimum loaded computing device hosting the requested resource and establishes communication over the overlay network. Thus, the DNS load balancing module restricts the access to the resource over the underlay network by providing the overlay IP address of the third computing device 102c to the first computing device 102a.

Figure 2A:
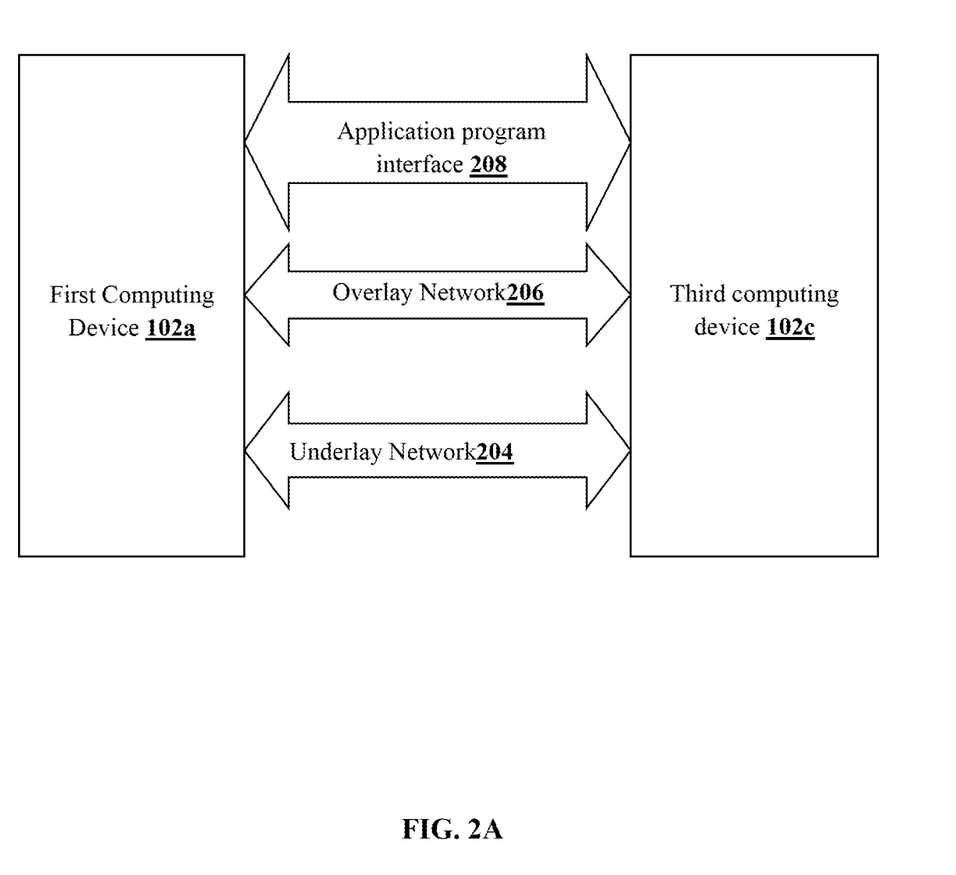
FIG. 2A illustrates a network topology diagram, according to one embodiment herein.

FIG. 2A illustrates a network topology diagram, according to one embodiment herein. The network topology diagram depicts a first computing device 102a communicating with a third computing device 102c. The examples of the first computing device 102a and the third computing device 102c includes but are not limited to a computer, laptop, mobile device, server, database and the like. The communication between the first computing device 102a and the third computing device 102c is established initially over an underlay network interface 204 such as internet. Further, an overlay network 206 is created over the underlay network 204 such as color zones. Further, the network topology diagram comprises an application program interface 208 to establish, communication with a resource.

Figure 2B:
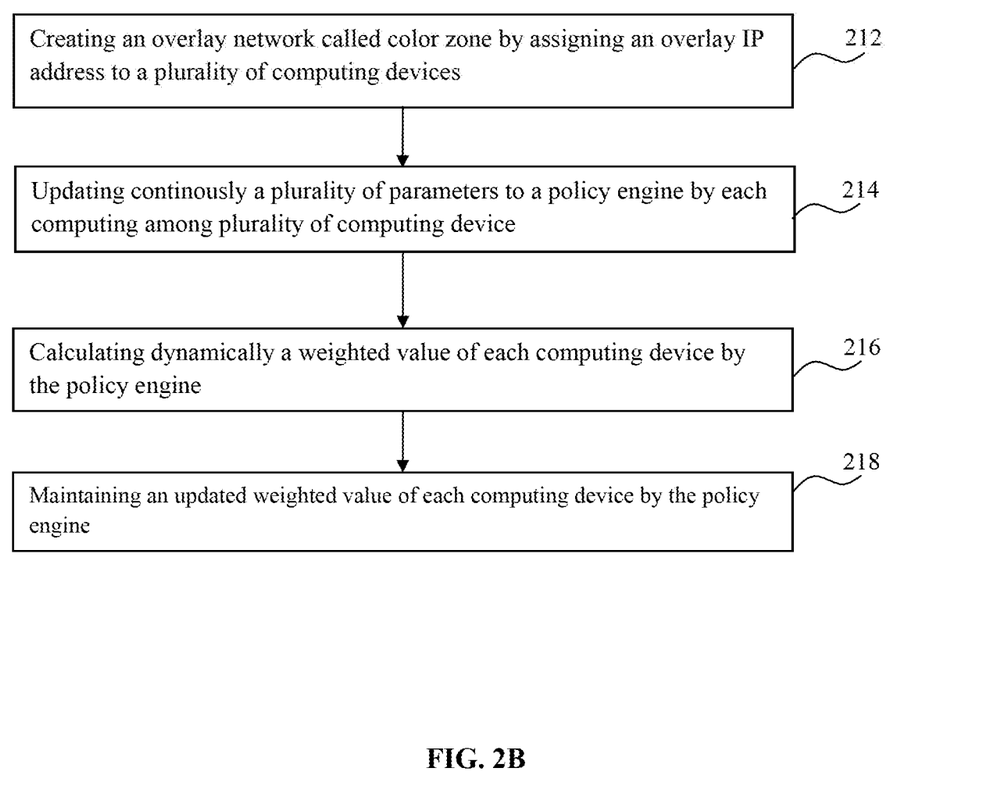
FIG. 2B illustrates a flow diagram representing a method of calculating and maintaining a weighted value for each computing device among the plurality of computing devices, according to one embodiment herein.

FIG. 2B illustrates a flow diagram representing a method of calculating and maintaining a weighted value for each computing device among the plurality of computing devices, according to one embodiment herein. The method includes creating an overlay network called a color zone with a plurality of computing devices communicating over the color zone (212). The examples of the plurality of computing devices include but are not limited to computer, laptop, mobile phone, server, database and the like. The color zone is created by assigning an overlay IP address for each computing device for enabling the plurality of computing devices to communicate over the color zone. The overlay IP address assigned to each computing device is stored in a second DNS server. The overlay IP address of each computing device and the corresponding underlay IP address are stored in a database.

Further, the method includes updating continuously a plurality of parameters to a policy engine by each computing device among the plurality of computing device (214). The policy engine is located in a DNS load balancing module. The plurality of parameters includes but is not limited to Central Processing Unit (CPU) capability, current CPU utilization, free Random Access Memory (RAM) availability, bandwidth of overlay network interface, current utilization of overlay interface, geolocation of the computing device, network latency, and network congestion. The plurality of computing devices updates the policy engine continuously in regular interval of time. Further, the policy engine is updated whenever a new resource is installed in a computing device.

The method further includes calculating dynamically a weighted value of each computing device by the policy engine (216). The weighted value of each computing device is calculated based on the plurality of parameters updated on the policy engine. The weighted value is calculated using specific algorithm to select the best computing device. Further, the method includes maintaining the updated weighted value of each computing device by the policy engine (218). The policy engine regularly check if the weighted value is updated based on the dynamically changing parameters.

Figure 2C:
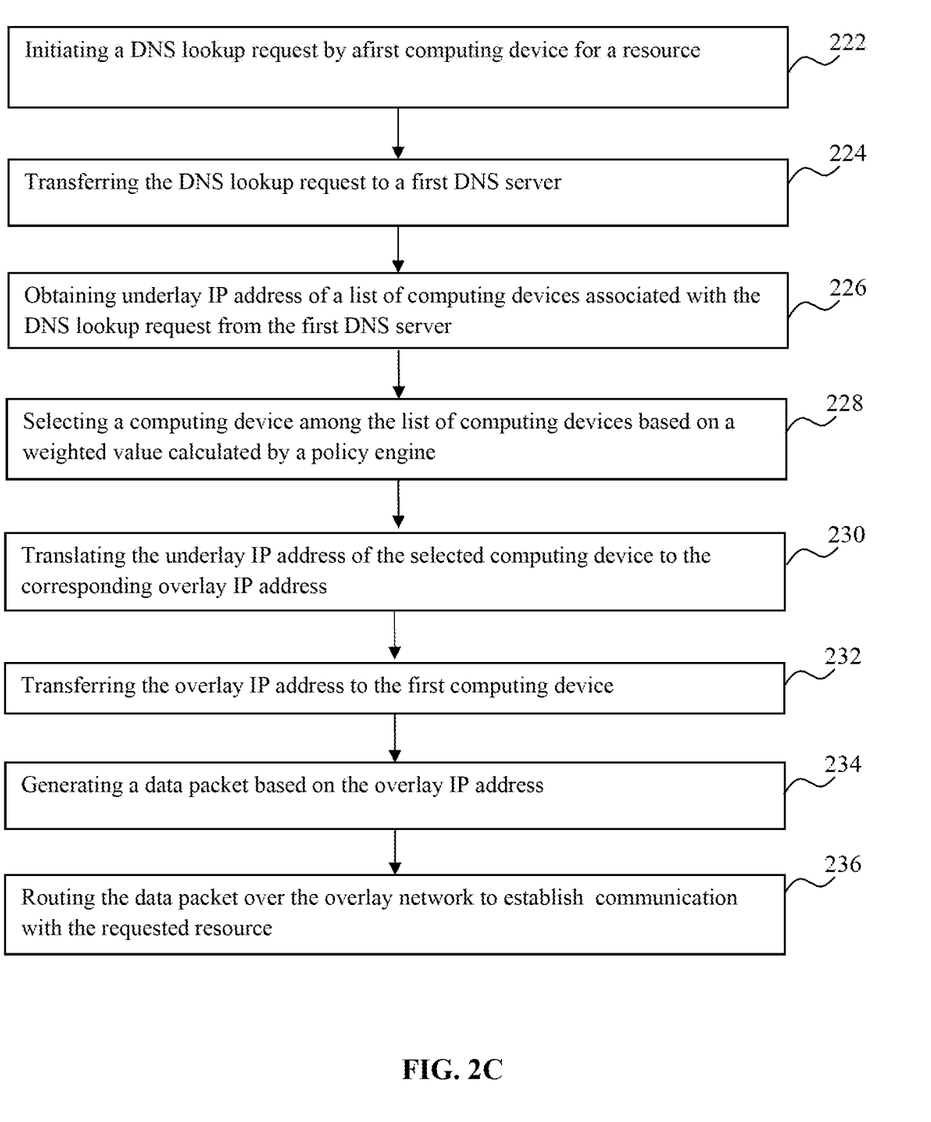
FIG. 2C illustrates a flow diagram a method of performing load balancing by routing data packets to a selected computing device, according to one embodiment herein.

FIG. 2C illustrates a flow diagram a method of performing load balancing by routing data packets to a selected computing device, according to one embodiment herein. The method includes initiating a DNS lookup request for a resource by a first computing device among a plurality of computing devices (222). The DNS lookup request is a URL corresponding to the resource. The plurality of computing devices communicates with each other over at overlay network. The overlay network is created over an underlay network. The method includes transferring the DNS lookup request to a first DNS server (224). The first DNS server stores URL of each resource on the plurality of computing devices and the underlay IP address of each computing device among the plurality of computing devices.

Further, the method includes obtaining the underlay IP address of a list of computing devices associated with the DNS lookup request from the first DNS server (226). The underlay IP address of the list of computing devices is obtained by identifying the underlay IP address of the computing device comprising the requested resource. The underlay IP address the list of computing devices comprising the requested resource is thus obtained.

Further, the method includes selecting a computing device among the list of computing devices based on a weighted value calculated by the policy engine (228). The weighted value of each computing device among the plurality of computing device is calculated and maintained by the policy engine. The weighted value is calculated based on a plurality of parameters updated continually on the policy engine by each computing device among the plurality of computing devices. The plurality of parameters includes but is not limited to CPU capability, current CPU utilization, free RAM availability, bandwidth of overlay network interlace, current utilization of overlay interface geolocation of the computing device, network latency, and network congestion. The weighted value of the list of computing devices among the plurality of computing devices maintained in the policy engine is checked to identify the computing device with maximum weighted value. The weighted value interprets the load on each computing device. The computing device with maximum weighted value depicts the least loaded device. Thus the computing device is selected among the list of computing devices.

The method further includes translating the underlay IP address of the selected computing device to the corresponding overlay address (230). The underlay IP addresses of the list of computing devices are obtained from the first DNS server. The overlay IP address of each computing device among the plurality of computing devices is stored on the second DNS server. The overlay IP address and the underlay IP address of each computing device is stored on a database. Thus, the overlay IP address of the selected computing device is identified based on the corresponding underlay IP. The underlay IP address is further translated to the overlay IP address.

The method further includes transferring the overlay IP address of the selected computing device to the first computing device (232). Further the method includes generating a data packet based on the overlay IP address (234). The data packet comprises a header and a payload. The header comprises a source IP address and a destination IP address. The data packet is generated by assigning the overlay IP address of the first computing device as the source IP address and the overlay IP address of the selected computing device as the destination IP address. Further, the method includes routing the data packet over the overlay network to establish communication with the requested resource (236).

Figure 3:
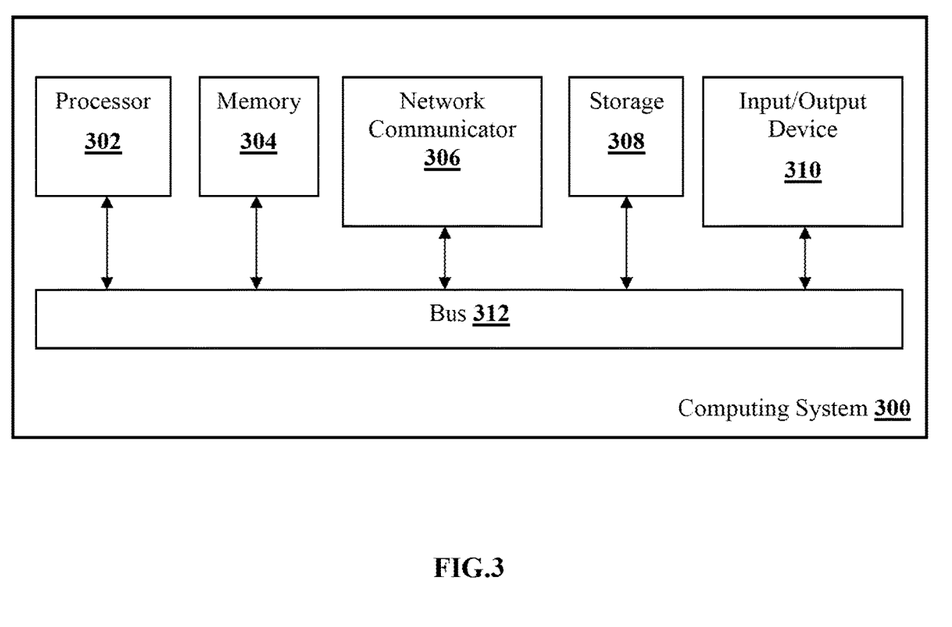
FIG. 3 is a block diagram illustrating a computing system consistent with implementations of the current subject matter, according to one embodiment herein.

FIG. 3 is a block diagram illustrating a computing system 300 consistent with implementations of the current subject matter. As shown in FIG. 3, the computing system 300 can include a processor 302, a memory 304, network communicator 306, a storage device 308, and input/output devices 310. The processor 302, the memory 304, network communicator 306, the storage device 308, and the input/output device 310 can be interconnected via a system bus 312. The processor 302 is capable of processing instructions for execution within the computing system 300. Such executed instructions can implement one or more components of, for example, application A. In some example embodiments, the processor 302 can be a single-threaded processor. Alternately, the processor 302 can be a multi-threaded processor or a multi-core processor. The processor 302 is capable of processing instructions stored in the memory 304 and/or on the storage device 308 to display graphical information for a user interface provided via the input/output device 310.

The memory 304 is a computer readable medium such as volatile or non-volatile that stores information within the computing system 300. The memory 304 can store instructions and/or other data associated with the processes disclosed herein. The storage device 308 is capable of providing persistent storage for the computing system 300. The storage device 308 can be a hard disk device, an optical disk device, or a tape device, or other suitable persistent storage means. The input/output device 310 provides input/output operations for the computing system 300. In some example embodiments, the input/output device 310 includes a keyboard and/or pointing device. In various implementations, the input/output device 310 includes a display unit for displaying graphical user interfaces.

According to some example embodiments, the input/output device 310 can provide input/output operations for a network device. For example, the input/output device 310 can include Ethernet ports or other networking ports to communicate with one or more wired and/or wireless networks (e.g, a local area network (LAN), a wide area network (WAN), the Internet).

In some example embodiments, the computing system 300 can be used to execute various interactive computer software applications that can be used for organization, analysis and/or storage of data in various formats. Alternatively, the computing system 300 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 310. The user interface can be generated and presented to a user by the computing system 300 (e.g., on a computer screen monitor, etc.).

Therefore, the embodiments herein disclose a method of performing load balancing over the overlay network. The method includes efficiently distributing die traffic across multiple computing devices connected over the overlay network. The method includes selecting a least loaded computing device for each DNS lookup request for routing the traffic over the overlay network. Thus the method optimize the use of each resource, maximize throughput of the overlay network. The method also enables to minimize response time, and avoid overload of a single resource; in a computing device.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer-implemented system for performing load balancing on an overlay network comprising a plurality of communicably coupled computing devices, said system comprising:
    a processor;
    a memory module communicatively coupled to said processor, said memory module storing computer program code, wherein said memory module and computer program code stored therein are configured, with the processor, to:
        on receiving a request from a first computing device to access a network resource located on at least one of said computing devices communicably coupled via said overlay network, retrieve from each of said computing devices, operational parameters corresponding to each of said computing devices, said operational parameters selected from a group of parameters consisting of central processing unit (CPU) capability, current CPU utilization, random access memory (RAM) space availability, bandwidth of said overlay network, current utilization levels of said overlay network, geolocation of each of said computing devices, latency of said overlay network, and congestion witnessed on said overlay network;
        determine and assign a weighted value to each of said computing devices, based on said operational parameters corresponding to each of said computing devices, and wherein said weighted value is a sum total of values assigned to each of said operational parameters;
        selectively prioritize at least one predetermined operational parameter corresponding to each of said computing devices, over remainder of said operational parameters, during a selection of at least one computing device from amongst said computing devices for servicing said request generated by said first computing device, based at least on a value assigned to said predetermined operational parameter;
        selectively override said at least one predetermined operational parameter, based on said values assigned to each of said remainder of operational parameters corresponding to each of said computing devices, and further based on a comparison between said values assigned to each of said remainder of operational parameters;
        select at least one computing device from said computing devices for servicing said request generated by said first computing device, based on a comparison between said weighted value assigned to each of said computing devices, and further based selectively on said value assigned to said at least one predetermined operational parameter corresponding to each of said computing devices;
        trigger said at least one computing device selected from amongst said computing devices to establish a communication session with said first computing device over said overlay network, only in an event an access policy installed on said at least one computing device matches an access policy installed on said first computing device.

2. The processor as claimed in claim 1, wherein said processor is further configured to trigger a first domain name system (DNS) server to assign underlay IP addresses to each of said computing devices, said processor further configured to identify each of said computing devices by corresponding underlay IP addresses on an underlay network communicably coupling each of said computing devices.

3. The processor as claimed in claim 2, wherein said processor is further configured to trigger said first DNS server to store thereon, at least uniform resource locators (URLs) corresponding to each network resource accessible through each of said computing devices, said processor further configured to trigger said first DNS server to map each of said URLs to said underlay IP addresses of corresponding computing devices.

4. The processor as claimed in claim 1, wherein said processor is further configured to trigger a second DNS server to assign overlay IP addresses to each of said computing devices, said processor further configured to identify each of said computing devices by corresponding overlay IP addresses on said overlay network.

5. The processor as claimed in claim 1, wherein said processor is configured to identify at least one minimum loaded computing device amongst said computing devices, based on said weighted value corresponding to each of said computing devices, and triggers said minimum loaded computing device to service said request generated by said first computing device, on said overlay network.

6. The processor as claimed in claim 1, wherein said processor is further configured to selectively override said at least one predetermined operational parameter corresponding to each of said computing devices, based on a second sum total indicating a summation of said remainder of operational parameters corresponding to each of said computing devices, and further based on a comparison between said second sum total of said remainder of operational parameters corresponding to each of said computing devices.

7. A computer-implemented method for performing load balancing on an overlay network comprising a plurality of communicably coupled computing devices, said method comprising:
    receiving, by a processor, a request from a first computing device to access a network resource located on at least one of said computing devices communicably coupled via said overlay network;
    retrieving from each of said computing devices, by said processor, operational parameters corresponding to each of said computing devices, said operational parameters selected from a group of parameters consisting of central processing unit (CPU) capability, current CPU utilization, random access memory (RAM) space availability, bandwidth of said overlay network, current utilization levels of said overlay network, geolocation of each of said computing devices, latency of said overlay network, and congestion witnessed on said overlay network;

determining, by said processor, based on said operational parameters corresponding to each of said computing devices, a weighted value corresponding to each of said computing devices, said weighted value being a sum total of values assigned to each of said operational parameters;

assigning, by said processor, each of said computing devices with said corresponding weighted value;

selectively prioritizing, by said processor, at least one predetermined operational parameter corresponding to each of said computing devices, over remainder of said operational parameters, during a selection of at least one computing device from amongst said computing devices for servicing said request generated by said first computing device, based at least on a value assigned to said predetermined operational parameter;

selectively overriding, by said processor, said at least one predetermined operational parameter, based on said values assigned to each of said remainder of operational parameters corresponding to each of said computing devices, and further based on a comparison, by said processor, between said values assigned to each of said remainder of operational parameters;

selecting, by said processor, at least one computing device from said computing devices for servicing said request generated by said first computing device, based on a comparison between said weighted value assigned to each of said computing devices, and further based selectively on said value assigned to said at least one predetermined operational parameter; and triggering, by said processor, said at least one computing device selected from amongst said computing devices to establish a communication session with said first computing device over said overlay network, only in an event an access policy installed on said at least one computing device matches an access policy installed on said first computing device.

8. The method as claimed in claim 7, wherein the method further includes triggering, by said processor, a first domain name system (DNS) server to assign underlay IP addresses to each of said computing devices, and identifying, by said processor, each of said computing devices by corresponding underlay IP addresses on an underlay network communicably coupling each of said computing devices.

9. The method as claimed in claim 8, wherein the method further includes triggering, by said processor, said first DNS server to store thereon, at least uniform resource locators (URLs) corresponding to each network resource accessible through each of said computing devices, and triggering, by said processor, said first DNS server to map each of said URLs to said underlay IP addresses of corresponding computing devices.

10. The method as claimed in claim 7, wherein the method further includes triggering, by said processor, a second DNS server to assign overlay IP addresses to each of said computing devices, and identifying, by said processor, each of said computing devices by corresponding overlay IP addresses on said overlay network.

11. The method as claimed in claim 7, wherein the method further includes identifying, by said processor, at least one minimum loaded computing device amongst said computing devices, based on said weighted value corresponding to each of said computing devices, and triggering, by said processor, said minimum loaded computing device to service said request generated by said first computing device, on said overlay network.

12. The method as claimed in claim 7, wherein selectively overriding, by said processor, said at least one predetermined operational parameter, further includes selectively overriding said at least one predetermined operational parameter based on a second sum total indicating a summation of said remainder of operational parameters corresponding to each of said computing devices, and further based on a comparison, by said processor, between said second sum total of said remainder of operational parameters corresponding to each of said computing devices.

13. A non-transitory computer-readable storage medium having computer-executable instructions stored thereon, said computer-executable instructions, when executed by a processor cause said processor to:

receive a request from a first computing device to access a network resource located on at least one of said computing devices communicably coupled via said overlay network;

retrieve from each of said computing devices, operational parameters corresponding to each of said computing devices, said operational parameters selected from a group of parameters consisting of central processing unit (CPU) capability, current CPU utilization, random access memory (RAM) space availability, bandwidth of said overlay network, current utilization levels of said overlay network, geolocation of each of said computing devices, latency of said overlay network, and congestion witnessed on said overlay network;

determine, based on said operational parameters corresponding to each of said computing devices, a weighted value corresponding to each of said computing devices, said weighted value being a sum total of values assigned to each of said operational parameters;

assign each of said computing devices with said corresponding weighted value;

selectively prioritize at least one predetermined operational parameter corresponding to each of said computing devices, over remainder of said operational parameters, during a selection of at least one computing device from amongst said computing devices for servicing said request generated by said first computing device, based at least on a value assigned to said predetermined operational parameter;

selectively override said at least one predetermined operational parameter, based on said values assigned to each of said remainder of operational parameters corresponding to each of said computing devices, and further based on a comparison between said values assigned to each of said remainder of operational parameters;

select at least one computing device from said computing devices for servicing said request generated by said first computing device, based on a comparison between said weighted value assigned to each of said computing devices, and further based selectively on said value assigned to said at least one predetermined operational parameter; and trigger said at least one computing device selected from amongst said computing devices to establish a communication session with said first computing device over said overlay network, only in an event an access policy installed on said at least one computing device matches an access policy installed on said first computing device.

14. The computer-executable instructions as claimed in claim 13, wherein said computer-executable instructions, when executed by said processor, further cause said processor to:
- trigger a first domain name system (DNS) server to assign underlay IP addresses to each of said computing devices, and identify each of said computing devices by corresponding underlay IP addresses on an underlay network communicably coupling each of said computing devices;
- trigger said first DNS server to store thereon, at least uniform resource locators (URLs) corresponding to each network resource accessible through each of said computing devices, and trigger said first DNS server to map each of said URLs to said underlay IP addresses of corresponding computing devices;
- trigger a second DNS server to assign overlay IP addresses to each of said computing devices, and identify each of said computing devices by corresponding overlay IP addresses on said overlay network;
- identify at least one minimum loaded computing device amongst said computing devices, based on said weighted value corresponding to each of said computing devices, and trigger said minimum loaded computing device to service said request generated by said first computing device, on said overlay network; and
- selectively override said at least one predetermined operational parameter based on a second sum total indicating a summation of said remainder of operational parameters corresponding to each of said computing devices, and further based on a comparison between said second sum total of said remainder of operational parameters corresponding to each of said computing devices.

* * * * *